(12) United States Patent
Won

(10) Patent No.: US 10,822,023 B2
(45) Date of Patent: Nov. 3, 2020

(54) ELECTRIC POWER STEERING APPARATUS HAVING REDUNDANCY FOR ENHANCING SAFETY

(71) Applicant: MANDO CORPORATION, Gyeonggi-do (KR)

(72) Inventor: Woo Seok Won, Gyeonggi-do (KR)

(73) Assignee: MANDO CORPORATION, Gyeonggi-do (KR)

(*) Notice: Subject to any disclaimer, the term of this patent is extended or adjusted under 35 U.S.C. 154(b) by 233 days.

(21) Appl. No.: 16/162,506

(22) Filed: Oct. 17, 2018

(65) Prior Publication Data

US 2019/0118856 A1 Apr. 25, 2019

(30) Foreign Application Priority Data

Oct. 24, 2017 (KR) .................. 10-2017-0138097

(51) Int. Cl.
  *B62D 5/04* (2006.01)
(52) U.S. Cl.
  CPC ......... *B62D 5/0484* (2013.01); *B62D 5/0403* (2013.01); *B62D 5/049* (2013.01)
(58) Field of Classification Search
  CPC .... B62D 5/0457; B62D 5/046; B62D 5/0463; B62D 5/0484; B62D 5/0403; B62D 5/049
  See application file for complete search history.

(56) References Cited

U.S. PATENT DOCUMENTS 10,053,142 B2 * 8/2018 Hisanaga ................. B62D 6/00
10,330,542 B1 * 6/2019 Pearce ....................... G01L 1/24
(Continued)

FOREIGN PATENT DOCUMENTS

| JP | 2017-191093 | 10/2017 |
|---|---|---|
| KR | 10-2017-0065430 | 6/2017 |
| WO | 2017/145797 | 3/2018 |

OTHER PUBLICATIONS

Office Action dated Dec. 13, 2018 for Korean Patent Application No. 10-2017-0138097 and its English machine translation by Google Translate.

Primary Examiner — Kevin Hurley
(74) Attorney, Agent, or Firm — Ladas & Parry, LLP

(57) ABSTRACT

The present disclosure aims to provide an electric power steering apparatus which is improved in reliability compared to an existing electric power steering apparatus by configuring redundancy for an electronic system therein. An embodiment provides a electric power steering apparatus including: a four-channel torque sensor including two independent dual die ICs; a four-channel steering angle sensor including two independent dual die ICs; a four-channel motor position sensor including two independent dual die ICs; a dual-wound Brushless AC (BLAC) motor including a first winding motor and a second winding motor therein; a first Electronic Control Unit (ECU); a second ECU; and a selector configured to select an ECU that controls steering among the first ECU and the second ECU. The first ECU and the second ECU are supplied with power from separate power supply devices which are separated from each other, the first winding motor of the dual-wound BLAC motor is connected to an inverter of the first ECU, and the second winding motor of the dual-wound BLAC is connected to an inverter of the second ECU.

14 Claims, 5 Drawing Sheets

(56) References Cited

U.S. PATENT DOCUMENTS

| | | | |
|---|---|---|---|
| 10,604,175 B2* | 3/2020 | Patel | B62D 5/0484 |
| 2019/0118857 A1* | 4/2019 | Won | B62D 5/0463 |
| 2020/0198694 A1* | 6/2020 | Kawamura | B62D 5/049 |
| 2020/0216114 A1* | 7/2020 | Barry | B62D 5/049 |

* cited by examiner

| | Single Wound Motor | Dual Wound Motor |
|---|---|---|
| Circuit |  |  |
| Figure |  | |
| Feature | Phase terminals : 3pcs(U, V, W) | Phase terminals : 6pcs(U1, U2, V1, V2, W1, W2) |

ELECTRIC POWER STEERING APPARATUS HAVING REDUNDANCY FOR ENHANCING SAFETY

CROSS REFERENCE TO RELATED APPLICATION

This application claims priority from Korean Patent Application No. 10-2017-0138097, filed on Oct. 24, 2017, which is hereby incorporated by reference for all purposes as if fully set forth herein.

BACKGROUND OF THE INVENTION

1. Field of the Invention

The present disclosure relates to an electric power steering apparatus, and more particularly, to an electric power steering apparatus in which redundancy is configured for each device in the electric steering apparatus such that steering is normally operated even if an abnormality occurs in an internal system.

2. Description of the Prior Art

Recently, vehicles are being provided with increasingly more electronic functions, and various electronic devices are installed in vehicles.

In order to control the electronic devices, vehicles are generally provided with an ECU (hereinafter, referred to as an "ECU") that receives electrical signals detected by various input sensors and outputs digital control signals for driving various actuators on the output side thereof. An electric power steering apparatus is capable of controlling the steering of the vehicle based on the above-described ECU.

In recent years, there has been an increasing need for reliability of such an electric power steering apparatus. Accordingly, there is a growing need to find a way to improve the safety level of an electronic system which contributes to the reliability among the components of the electric power steering apparatus. In particular, the importance of a safety improvement in the electric power steering apparatus is emphasized in that it can be combined with new technologies such as automatic driving in the future.

SUMMARY OF THE INVENTION

Accordingly, the present disclosure provides an electric power steering apparatus, in which reliability is improved compared to the existing steering apparatus by configuring redundancy for each component therein.

In order to solve the above-mentioned problems, an embodiment of the present disclosure provides a electric power steering apparatus including: a four-channel torque sensor including two independent dual die ICs; a four-channel steering angle sensor including two independent dual die ICs; a four-channel motor position sensor including two independent dual die ICs; a dual-wound Brushless AC (BLAC) motor including a first winding motor and a second winding motor therein; a first Electronic Control Unit (ECU); a second ECU; and a selector configured to select an ECU that controls steering among the first ECU and the second ECU. The first ECU and the second ECU are supplied with power from separate power supply devices which are separated from each other, the first winding motor of the dual-wound BLAC motor is connected to an inverter of the first ECU, and the second winding motor of the dual-wound BLAC is connected to an inverter of the second ECU.

According to the present disclosure, even when an abnormality occurs in an ECU or sensor constituting the electric power steering apparatus, it is possible to normally control steering using another ECU or sensor and to improve the safety level of the entire vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
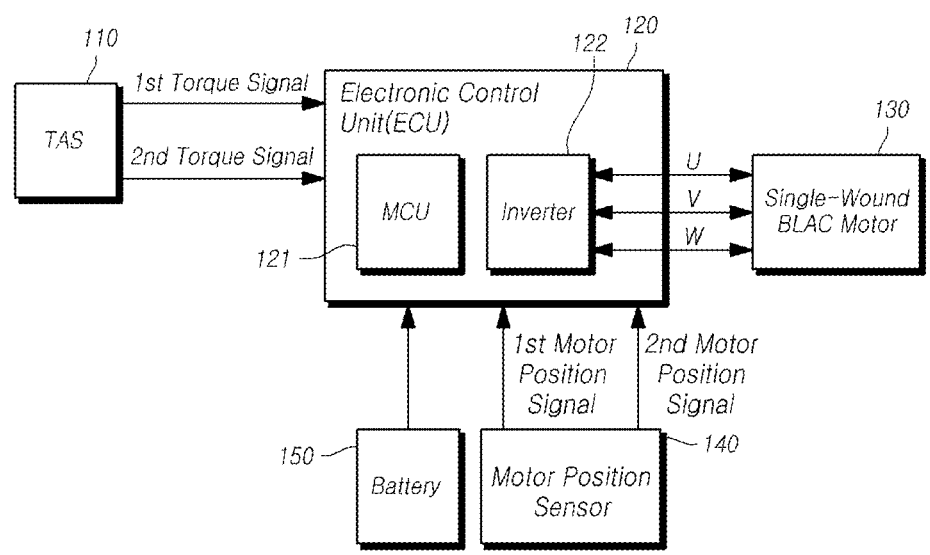
FIG. 1 is a diagram illustrating the configuration of an existing electric power steering apparatus.

Hereinafter, embodiments of the present disclosure will be described in detail with reference to the accompanying drawings. In the following description, the same components will be designated by the same reference numerals although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a diagram illustrating the configuration of an existing electric power steering apparatus.

In an existing electric power steering apparatus, a first torque signal and a second torque signal are transmitted to an ECU 120 from a Torque and Angle Sensor (TAS) 110. Each of the first torque signal and the second torque signal transmitted from the TAS 110 satisfies an Automobile Safety Integrity Level (ASIL) B.

The ASIL is defined in ISO 26262 and represents the risk management criteria for functional elements in a vehicle. As the ASIL increases from A to D, the level of required reliability increases. The existing electric power steering apparatus receives the first torque signal and the second torque signal in the level of ASIL B and performs signal processing in the level of ASIL B level for each of the first and second torque signals so as to implement a torque input signal in the level of ASIL D.

The ECU 120 of the existing electric power steering apparatus includes a Micro-Controller Unit (MCU) 121 and an inverter 122 therein.

The MCU 121 performs the functions of processing a torque signal, a steering angle signal, and a motor position signal input to the ECU 120 and controlling the inverter 122. The MCU 121 that processes signals is physically a single device, but has a self-diagnosis function using a check core therein.

The inverter 122 is connected to U, V, and W terminals of a single-wound BLAC (Brushless AC) motor 130 so as to control the operation of the single-wound BLAC motor 130.

The BLAC motor means a brushless motor having a back-electromotive force in the form of a sinusoidal waveform, and the single-winding BLAC motor 130 has one winding motor therein.

In the existing electric power steering apparatus, a first motor position signal and a second motor position signal are transmitted from a motor position sensor 140 to the ECU 120. As in the TAS 110, each of the first motor position signal and the second motor position signal satisfies the ASIL B, and the existing electric power steering apparatus receives the first motor position signal and the second motor position signal in the level of ASIL B so as to implement a motor position input signal in the level of ASIL D. The content of implementing a signal in the level of ASIL D by combining two signals in the level of ASIL B is defined in ISO 26262.

A battery 150 performs a function of supplying power to the ECU 120. When an abnormality occurs in the battery 150 and the supplied voltage is equal to or lower than a threshold, the ECU 120 may not operate normally.

Figure 2:
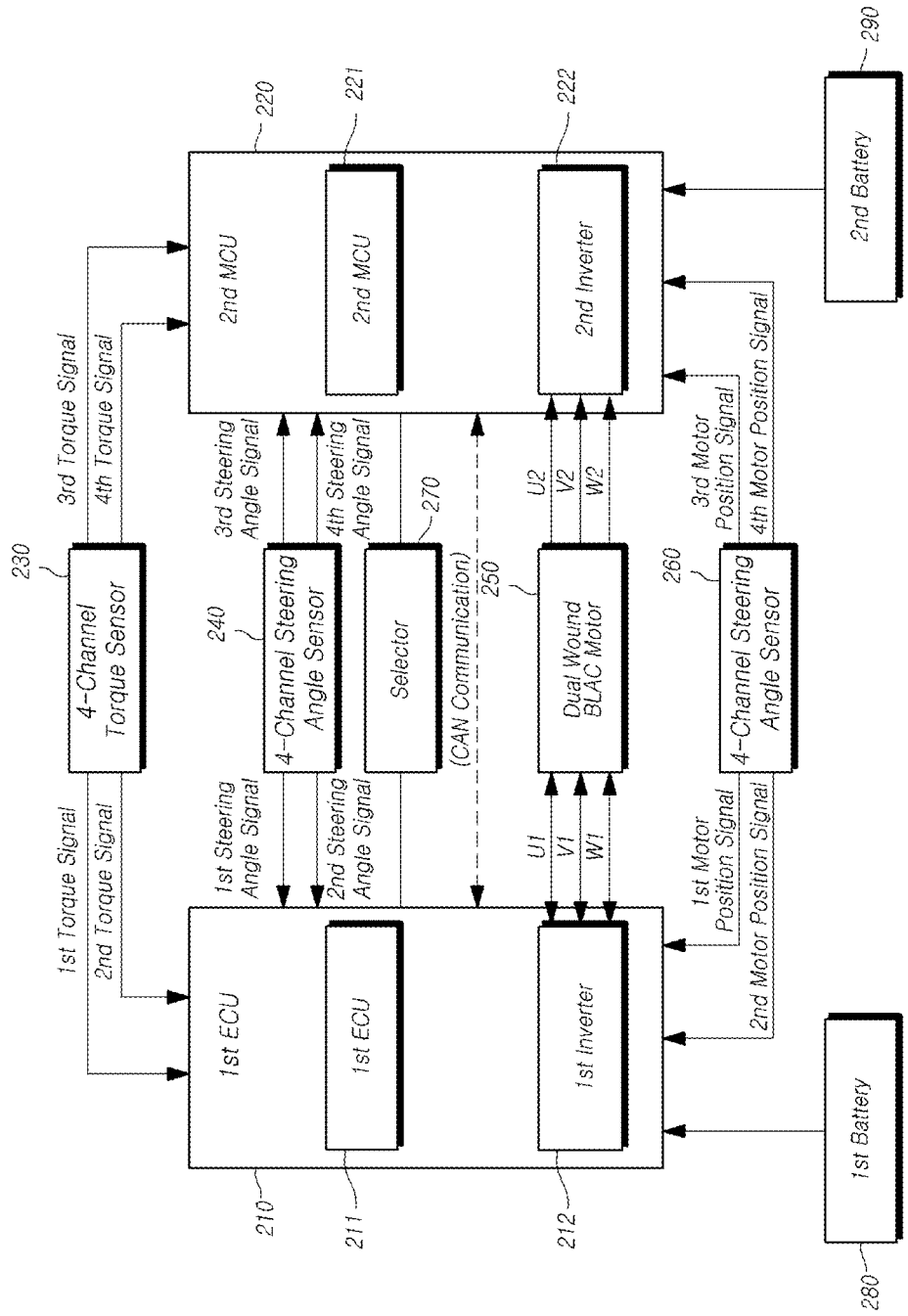
FIG. 2 is a diagram illustrating the configuration of an electric power steering apparatus according to one embodiment.

FIG. 2 is a diagram illustrating the configuration of an electric power steering apparatus according to one embodiment.

Referring to FIG. 2, redundancy is configured for each component in one electric power steering apparatus. That is, two ECUs having the same operation and safety coverage exist in one electric power steering apparatus in order to ensure that, under a situation in which one of the two ECUs cannot operate normally, the electric power steering apparatus is operated using the other ECU.

Therefore, even if an abnormality occurs in the operation of one ECU, a steering control can be performed using another ECU, so that the overall stability of the electric power steering apparatus can be improved.

The electric power steering apparatus may include a first ECU 210 and a second ECU 220. The first ECU 210 may include a first MCU 211 and the first inverter 212 therein, and the second ECU 220 may include a second MCU 221 and a second inverter 222 therein.

The first MCU 211 may perform the functions of processing a torque signal, a steering angle signal, and a motor position signal input to the first ECU 210 and controlling the first inverter 212, and the first inverter 212 performs the function of controlling the operation of a first winding motor of a dual-wound BLAC motor 250 by being connected to U1, V1, and W1 terminals of a dual-wound BLAC motor 250.

A phase cut-off module may be interposed between the first inverter 212 and the dual-wound BLAC motor 250 so as to cut off power supply to the first winding motor of the dual-wound BLAC motor 250 when a failure of the first ECU 210 is sensed.

The second MCU 221 may perform the functions of processing a torque signal, a steering angle signal, and a motor position signal input to the second ECU 220 and controlling the second inverter 222, and the second inverter 222 performs the function of controlling the operation of a second winding motor of the dual-wound BLAC motor 250 by being connected to U2, V2, and W2 terminals of the dual-wound BLAC motor 250.

A phase cut-off module may be interposed between the second inverter 222 and the dual-wound BLAC motor 250 so as to cut off power supply to the second winding motor of the dual-wound BLAC motor 250 when a failure of the second ECU 220 is sensed.

The first ECU 210 and the second ECU 220 have the same configuration except for one pin of the I/O port of the MCU of each ECU. The voltage connected to the pins of the I/O port of the first MCU 211 of the first ECU 210 and the voltage connected to the pins of the I/O port of the second MCU 221 of the second ECU 220 may be different from each other.

For example, a ground may be connected to the first ECU 210, and 5V may be connected to the second ECU 220. Therefore, each ECU may be distinguished whether it is the first ECU or the second ECU using the information of voltage connected to the pins of the I/O port thereof.

In addition, the first ECU 210 and the second ECU 220 may communicate with other devices of the vehicle through a CAN bus and may transmit diagnostic information according to an OEM specification, and the ECUs may exchange information therebetween using CAN communication.

A four-channel torque sensor 230 may transmit a torque signal value to the first ECU 210 and the second ECU 220. The four-channel torque sensor 230 may transmit a first torque signal, a second torque signal, a third torque signal, and a fourth torque signal. During the normal operation, all the above-mentioned four torque signals have the same value.

The four-channel torque sensor 230 may include two independent dual die ICs therein, and the first torque signal and the second torque signal may be generated in one dual-die integrated circuit and the third torque signal and the fourth torque signal may be generated in the other dual-die integrated circuit. The four-channel torque sensor 230 transmits the first torque signal and the second torque signal to the first ECU 210, and transmits the third torque signal and the fourth torque signal to the second ECU 220, so that respective ECUs can use torque signals that are independent from each other. Since the respective ECUs use torque signals that are independent of each other, even when there is an abnormality in a torque signal input to one ECU, the other ECU is capable of receiving a normal torque signal. Hereinafter, the operation of the four-channel torque sensor 230 will be described in more detail with reference to FIG. 3.

A four-channel steering angle sensor 240 may transmit a steering angle signal value to the first ECU 210 and the second ECU 220. The four-channel steering angle sensor 240 may transmit a first steering angle signal, a second steering angle signal, a third steering angle signal, and a fourth steering angle signal. During the normal operation, all the four steering angle signals have the same value. The first steering angle signal and the second steering angle signal may be generated in one dual die IC and the third steering angle signal and the fourth steering angle signal may be generated in another dual die IC.

In addition, the four-channel steering angle sensor 240 transmits the first steering angle signal and the second steering angle signal to the first ECU 210, and transmit the third steering angle signal and the fourth steering angle signal to the second ECU 220, so that the respective ECUs are capable of using the steering angle signals that are independent from each other. Since the respective ECUs use steering angle signals that are independent of each other, even when there is an abnormality in a steering angle signal input to one ECU, the other ECU is capable of receiving a normal steering angle signal.

A dual-wound brushless BLAC motor 250 may be seen as a single motor externally. However, internally, the dual-wound brushless BLAC motor 250 is constituted with two motors, including a first winding motor and a second winding motor therein.

The first winding motor may be connected to the first ECU 210 via the terminals U1, V1 and W1, and the second winding motor may be connected to the second ECU 220 via the terminals U2, V2, and W2. Hereinafter, the operation of the dual-wound BLAC motor 250 will be described in detail with reference to FIG. 5.

A four-channel motor position sensor 260 may transmit a motor position signal value to the first ECU 210 and the second ECU 220. The four-channel motor position sensor 260 may transmit a first motor position signal, a second motor position signal, a third motor position signal, and a fourth motor position signal. During the normal operation, all the four motor position signals have the same value.

The four-channel motor position sensor 260 may include two independent dual die ICs, and the first motor position signal and the second motor position signal may be generated in one dual-die integrated circuit, and the third motor position signal and the fourth motor position signal may be generated in the other dual-die integrated circuit. In addition, the four-channel motor position sensor 260 transmits the first motor position signal and the second motor position signal to the first ECU 210, and transmits the third motor position signal and the fourth motor position signal to the second ECU 220, so that the respective ECUs are capable of using the motor position signals that are independent from each other. Since the respective ECUs use motor position signals that are independent of each other, even when there is an abnormality in a motor position signal input to one ECU, the other ECU is capable of receiving a normal motor position signal. Hereinafter, the operation of the four-channel motor position sensor 260 will be described in more detail with reference to FIG. 4.

A selector 270 may select an ECU for controlling the steering from the first ECU 210 and the second ECU 220. The reason why two ECUs are present in parallel in the present disclosure is to normally operate the electric power steering apparatus, when an abnormality occurs in one of the two ECUs, using the other ECU.

Therefore, the selector 270 may select only one of the first ECU 210 and the second ECU 220 as an ECU for controlling the steering, and in this case, the non-selected ECU does not affect the control of the steering. Hereinafter, a case in which only one of the first ECU 210 and the second ECU 220 is selected as the ECU for controlling the steering by the selector 270 will be described as an example.

The selector 270 selects the first ECU 210 as the ECU for controlling the steering when the vehicle starts traveling. At this time, the second ECU 220 is in a standby state.

When it is determined that the steering control cannot be performed by the first ECU 210 due to an abnormality occurring in the first ECU 210 while the steering is being controlled by the first ECU 210, the selector 270 is capable of selecting the second ECU 220 as the ECU for controlling the steering. Once the control right is turned over from the first ECU 210 to the second ECU 220, the selector 270 does not turn over the control right to the first ECU 210 again until the traveling of the vehicle is finished.

As an example for determining occurrence of the above-mentioned abnormality, the selector 270 may determine whether or not the abnormality occurs by comparing the signal values of the first torque signal and the second torque signal. When the first torque signal and the second torque signal transmitted to the first ECU 210 are equal to each other, the values of the two received torque signals can be relied on. However, when a difference occurs, it is impossible to determine which one of the received torque signal values received by the first ECU 210 should be used. Accordingly, the selector 270 selects the second ECU 220 as the ECU for controlling the steering instead of the ECU 210.

As another example for determining occurrence of the above-mentioned abnormality, the selector 270 may determine whether or not the abnormality occurs by comparing the signal values of the first motor position signal and the second motor position signal. When the first motor position signal and the second motor position signal transmitted to the first ECU 210 are equal to each other, the values of the two received motor position signals can be relied on. However, when a difference occurs, it is impossible to determine which one of the motor position signal values received by the first ECU 210 should be used. Accordingly, the selector 270 selects the second ECU 220 as the ECU for controlling the steering instead of the first ECU 210.

As another example of determining occurrence of the above-mentioned abnormality, when the voltage of the battery power source, which is supplied to the first ECU 210, is less than a preset threshold voltage, the selector 270 may select the second ECU 220 as the ECU for controlling the steering. When an abnormality occurs in the battery or an abnormality occurs in an actuator that charges the battery, the battery voltage supplied to an ECU continuously decreases. Accordingly, when the voltage of the battery power source, which is supplied to the first ECU 210 decreases below a preset threshold voltage, there is a high possibility that the first ECU 210 will perform an abnormal operation because the first ECU 210 cannot receive power required for operation. Accordingly, the selector 270 may select the second ECU 220 as the ECU for controlling the steering instead of the first ECU 210.

As another example for determining occurrence of the above-mentioned abnormality, when it is determined that a failure has occurred in the first ECU 210 itself, the selector 270 may select the second ECU 220 as the ECU for controlling the steering. In this case, whether or not the failure has occurred in the first ECU 210 itself may be determined through a separate sensor or software.

When the selector selects the second ECU 220 as the ECU for controlling the steering, the second ECU 220 may use the first torque signal and the second torque signal transmitted to the first ECU 210 as well as the third torque signal and the fourth torque signal, so that the calculation reliability of a torque value can be improved.

When the values of the third torque signal and the fourth torque signal are equal to each other, the second ECU 220 may calculate the torque value using one of the two torque signals. However, when a difference occurs between the values of the two torque signals, the second ECU 220 may use the values of the first torque signal and the second torque signal in order to determine which or not a torque signal value is correct. Since the first torque signal and the second torque signal are not directly transmitted to the second ECU 220, the second ECU 220 may receive the first torque signal value and the second torque signal value from the first ECU 210 having the first torque signal value and the second torque signal value via the CAN communication.

When two or more torque signals among the first torque signal, the second torque signal, the third torque signal, and the fourth torque signal have the same signal value, the second ECU 220 may calculate a torque value based on the same torque signal value. When two or more torque signals have the same value, there is a high possibility that the torque signal value is normal compared to other torque signal values that are not the same.

Table 1 below shows the selection of a torque signal used for steering control.

Meanwhile, unlike the above-described examples, it is also possible that the first ECU 210 and the second ECU 220 simultaneously control the steering. In this case, the selector 270 may select both the first ECU 210 and the second ECU 220 as the ECUs for controlling the steering.

When the first ECU 210 and the second ECU 220 control the steering simultaneously, in the dual-wound BLAC motor 250, the output of the first winding motor controlled by the first ECU 210 and the output of the second winding motor controlled by the second ECU 220 may be the same.

However, in this case, when an abnormality occurs in one of the two ECUs, the selector 270 is capable of controlling the steering with only one remaining ECU in which the abnormality does not occur, as in the above-described examples.

For example, when it is determined that it is impossible to perform the steering control only by the first ECU 210 due to an abnormality occurring in the first ECU 210, the selector 270 may select only the second ECU 220 as the ECU for controlling the steering.

As an example of a method of determining the above-described abnormality, the selector 270 may determine occurrence of an abnormality by comparing the signal

TABLE 1

| | | | | |
|---|---|---|---|---|
| $1^{st}$ Torque Signal | OK | OK | OK | OK |
| $2^{nd}$ Torque Signal | OK | NG | OK | OK |
| $3^{rd}$ Torque Signal | OK | OK | NG | OK |
| $4^{th}$ Torque Signal | OK | OK | OK | NG |
| Torque signal used for steering control | $1^{st}$ Torque Signal or $2^{nd}$ Torque Signal | $1^{st}$ Torque Signal or $3^{rd}$ Torque Signal | $1^{st}$ Torque Signal or $2^{nd}$ Torque Signal | $1^{st}$ Torque Signal or $2^{nd}$ Torque Signal |
| $1^{st}$ Torque Signal | NG | NG | NG | OK |
| $2^{nd}$ Torque Signal | OK | OK | OK | OK |
| $3^{rd}$ Torque Signal | OK | NG | OK | NG |
| $4^{th}$ Torque Signal | OK | OK | NG | NG |
| Torque signal used for steering control | $2^{nd}$ Torque Signal or $3^{rd}$ Torque Signal | $2^{nd}$ Torque Signal or $4^{th}$ Torque Signal | $2^{nd}$ Torque Signal or $3^{rd}$ Torque Signal | $1^{st}$ Torque Signal or $2^{nd}$ Torque Signal |
| $1^{st}$ Torque Signal | OK | OK | NG | |
| $2^{nd}$ Torque Signal | NG | NG | NG | |
| $3^{rd}$ Torque Signal | OK | NG | OK | |
| $4^{th}$ Torque Signal | NG | OK | OK | |
| Torque signal used for steering control | $1^{st}$ Torque Signal or $3^{rd}$ Torque Signal | $1^{st}$ Torque Signal or $4^{th}$ Torque Signal | $1^{st}$ Torque Signal or $2^{nd}$ Torque Signal | |

In Table 1, "OK" means that there is another torque signal having the same signal value, and "NG" means that there is no other torque signal having the same signal value. Referring to Table 1, it can be seen that it is possible to calculate a torque value when the values of two or more torque signals are the same. In addition, when the values of three or more torque signals are the same, the torque value can be calculated using two smaller torque signal values. This is because when there are only two torque signals having the same value, reliability in the level of ASIL D can be ensured, as described above.

Meanwhile, since a motor position sensor has the cycle of signal transmission of about $\frac{1}{16000}$ seconds, which is much shorter than $\frac{1}{1000}$ seconds of a torque sensor, it is difficult to ensure the reliability of information transmitted through the CAN communication. Accordingly, in the second ECU 220, similarly to the torque signals, it is difficult to realize the operation of increasing the reliability of a motor position value by receiving the first motor position signal and the second motor position signal via the CAN communication, and only the third motor position signal and the fourth motor position signal are used.

values of the first torque signal and the second torque signal, as in the above-described examples. In addition, the selector 270 may determine occurrence of an abnormality by comparing the signal values of the first motor position signal and the second motor position signal. In addition, when the voltage of the battery power source, which is supplied to the first ECU 210, is less than a preset threshold voltage, the selector 270 may select the second ECU 220 as the ECU for controlling the steering.

A first battery 280 serves to supply power to the first ECU 210 and a second battery 290 serves to supply power to the second ECU 220. That is, the power supplied to the first ECU 210 and the power supplied to the second ECU 220 are separated.

The description "the powers are separated from each other" may mean that a separate power connector exists, or may been that a separate terminal exists in one power connector.

Since the power supplied to the first ECU 210 and the power supplied the second ECU 220 are separated from each other, even if an abnormality occurs in the power supplied to one ECU, the other ECU is capable of normally operating.

That is, the first and second ECUs 210 and 220 of the electric power steering apparatus receive different signal values and are substantially connected to separate motors.

As a result, although the electric power steering apparatus is configured in a single power pack housing, the electric power steering apparatus have the same effect as a internally configured separate subsystem, and thus can ensure redundancy.

Figure 3:
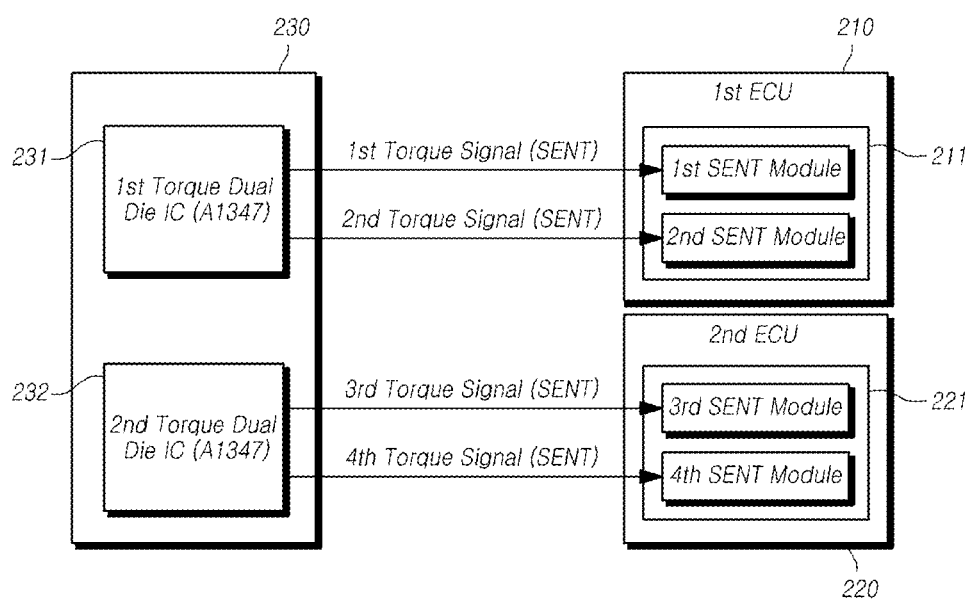
FIG. 3 is a diagram illustrating a configuration in which torque signals are transmitted from a four-channel torque sensor according to an embodiment of the present disclosure.

FIG. 3 is a diagram illustrating a configuration in which torque signals are transmitted from a four-channel torque sensor according to an embodiment of the present disclosure.

Referring to FIG. 3, a first torque dual die IC 231 and a second torque dual die IC 232 may be included in the four-channel torque sensor 230. Respective dual die ICs may be implemented by the same type of chips.

The first torque dual die IC 231 may send the first torque signal and the second torque signal to the first ECU 210, and the second torque dual die IC 232 may send the third torque signal and the fourth torque signal to the second ECU 220. The first MCU 211 of the first ECU 210 may receive the first torque signal and the second torque signal and the second MCU 221 of the second ECU 220 may receive the third torque signal and the fourth torque signal. The first ECU 210 and the second ECU 220 may implement a torque signal in the level of ASIL D by combining two torque signals in the level of ASIL B, which are transmitted thereto, respectively.

Each of the torque signals described above may be transmitted using a Single Edge Nibble Transmission (SENT) protocol. The SENT protocol is a unidirectional protocol standard that can be used to transmit and receive high resolution sensor data such as temperature, pressure, and position in a vehicle.

Figure 4:
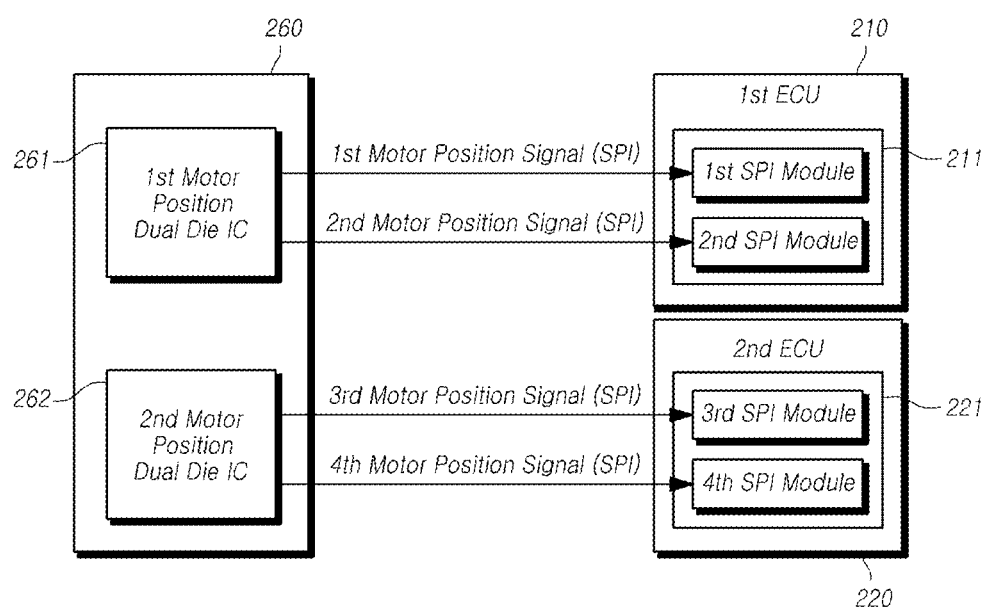
FIG. 4 is a diagram illustrating a configuration in which motor position signals are transmitted from a 4-channel motor position sensor according to an embodiment of the present disclosure.

FIG. 4 is a diagram illustrating a configuration in which motor position signals are transmitted from a 4-channel motor position sensor according to an embodiment of the present disclosure.

Referring to FIG. 4, a first motor position dual die IC 261 and a second motor position dual die IC 262 may be included in the four-channel torque sensor 260. Respective dual die ICs may be implemented by the same type of chips.

The first motor position dual die IC 261 may send the first motor position signal and the second motor position signal to the first ECU 210, and the second motor position dual die IC 262 may send the third motor position signal and the fourth motor position signal to the second ECU 220. The first MCU 211 of the first ECU 210 may receive the first motor position signal and the second motor position signal and the second MCU 221 of the second ECU 220 may receive the third motor position signal and the fourth motor position signal. The first ECU 210 and the second ECU 220 may implement a motor position signal in the level of ASIL D by combining two motor position signals in the level of ASIL B, which are transmitted thereto, respectively.

Each of the motor position signals described above may be transmitted using an SPI protocol. The SPI protocol is a protocol for serial communication between an MCU and a peripheral device, and supports communication between one master and one or more slaves by a synchronous communication scheme that synchronizes the MCU with the peripheral device via a clock.

Figure 5:
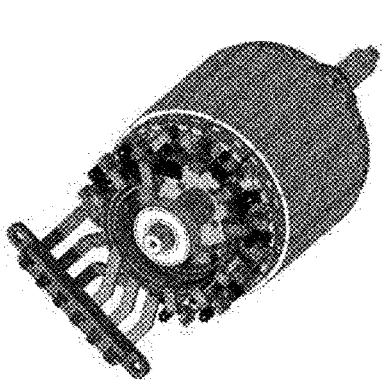
FIG. 5 is a diagram illustrating the configuration of a dual-wound BLAC motor according to an embodiment of the present disclosure.
Figure 5:
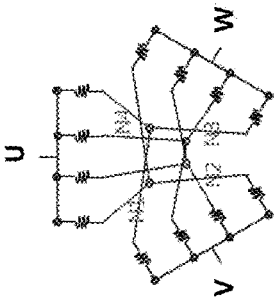
Figure 5:
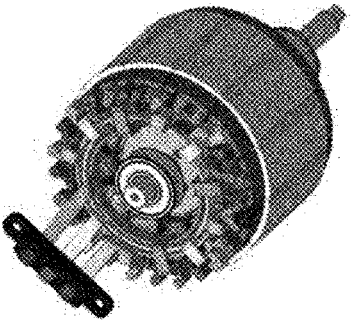

FIG. 5 is a diagram illustrating the configuration of a dual-wound BLAC motor according to an embodiment of the present disclosure.

Hereinafter, characteristics of a dual-wound BLAC motor will be described by comparison with a single-wound BLAC motor used in the existing electric power steering system.

The BLAC motor used in the electric power steering apparatus has a characteristic in which a torque is generated only when a specific voltage vector is applied at a specific rotor angle. Accordingly, in the dual-wound BLAC motor, in order to operate the internal first winding motor and the internal second winding motor separately, it is necessary to separately configure three-phase winding in the motor stator for each winding motor. Therefore, the number of terminals exposed to the outside of the dual-wound BLAC motor is six in total. In other words, in the single-wound BLAC motor, U, V, and W terminals are exposed to the outside, while, in the dual-wound BLAC motor, U1, U2, V1, V2, W1, and W2 terminals are exposed to the outside. Here, the U1, V1, and W1 terminals are connected to an internal first winding motor, and the U2, V2, and W2 terminals are connected to an inner second winding motor.

Each winding motor is driven by a voltage supplied separately to the connected three-phase terminals. Respective winding motors should be connected different inverters so as to be capable of operating independently. In the electric power steering apparatus of the present disclosure, since each of the first ECU 210 and the second ECU 220 has an inverter and the inverters to which the first winding motor and the second winding motor of the dual-wound BLAC motor are different from each other, the first winding motor and the second winding motor are capable of operating independently from each other.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

Although the embodiments of the present disclosure have been described for illustrative purposes, those skilled in the art will appreciate that various modifications, additions and substitutions are possible, without departing from the scope and spirit of the disclosure. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. An electric power steering apparatus comprising:
   a four-channel torque sensor comprising two independent dual die ICs;
   a four-channel steering angle sensor comprising two independent dual die ICs;
   a four-channel motor position sensor comprising two independent dual die ICs;
   a dual-wound Brushless AC (BLAC) motor comprising a first winding motor and a second winding motor therein;
   a first Electronic Control Unit (ECU);
   a second ECU; and
   a selector configured to select an ECU that controls steering among the first ECU and the second ECU,
   wherein the first ECU and the second ECU are supplied with power from separate power supply devices which are separated from each other, and
   the first winding motor of the dual-wound BLAC motor is connected to an inverter of the first ECU, and the second winding motor of the dual-wound BLAC is connected to an inverter of the second ECU.

2. The electric power steering apparatus of claim 1, wherein the four-channel torque sensor transmits a first torque signal and a second torque signal to the first ECU, and transmits a third torque signal and a fourth torque signal to the second ECU.

3. The electric power steering apparatus of claim 1, wherein the four-channel motor position sensor transmits a first motor position signal and a second motor position signal to the first ECU, and transmits a third motor position signal and a fourth motor position signal to the second ECU.

4. The electric power steering apparatus of claim 2, wherein the selector selects the second ECU as the ECU that controls the steering when a difference occurs between signal values of the first torque signal and the second torque signal.

5. The electric power steering apparatus of claim 3, wherein the selector selects the second ECU as the ECU that controls the steering when a difference occurs between signal values of the first motor position signal and the second motor position signal.

6. The electric power steering apparatus of claim 1, wherein the selector selects the second ECU as the ECU that controls the steering when a voltage of a battery power source supplied to the first ECU is lower than a preset threshold voltage.

7. The electric power steering apparatus of claim 1, wherein, in a case in which the second ECU is selected by the selector as the ECU that controls the steering, the second ECU receives the first torque signal and the second torque signal from the first ECU through CAN communication when a difference occurs between signal values of the third torque signal and the fourth torque signal, and calculates a torque value based on same torque signal value when two or more torque signals among the first torque signal, the second torque signal, the third torque signal, and the fourth torque signal have the same torque signal value.

8. The electric power steering apparatus of claim 1, wherein the first ECU and the second ECU is capable of controlling the steering simultaneously.

9. The electric power steering apparatus of claim 8, wherein an output of the first winding motor controlled by the first ECU and an output of the second winding motor controlled by the second ECU are equal to each other.

10. The electric power steering apparatus of claim 8, wherein the four-channel torque sensor transmits a first torque signal and a second torque signal to the first ECU, and transmits a third torque signal and a fourth torque signal to the second ECU.

11. The electric power steering apparatus of claim 8, wherein the four-channel motor position sensor transmits a first motor position signal and a second motor position signal to the first ECU, and transmits a third motor position signal and a fourth motor position signal to the second ECU.

12. The electric power steering apparatus of claim 10, wherein the selector selects only the second ECU as the ECU that controls the steering when a difference occurs between signal values of the first torque signal and the second torque signal.

13. The electric power steering apparatus of claim 11, wherein the selector selects only the second ECU as the ECU that controls the steering when a difference occurs between signal values of the first motor position signal and the second motor position signal.

14. The electric power steering apparatus of claim 8, wherein the selector selects only the second ECU as the ECU that controls the steering when a voltage of a battery power source supplied to the first ECU is lower than a preset threshold voltage.

* * * * *